United States Patent Office 3,833,659
Patented Sept. 3, 1974

3,833,659
PREPARATION OF OXYGEN-CONTAINING COMPOUNDS
Louis Schmerling, Riverside, and Herman S. Bloch, Des Plaines, Ill., assignors to Universal Oil Products Company, Des Plaines, Ill.
No Drawing. Continuation-in-part of abandoned application Ser. No. 883,322, Dec. 8, 1969. This application Apr. 5, 1973, Ser. No. 348,380
Int. Cl. C07c 45/02
U.S. Cl. 260—597    12 Claims

ABSTRACT OF THE DISCLOSURE

Oxygen-containing compounds as exemplified by ketones and aldehydes are prepared by converting diolefinic compounds to the desired products by reacting said olefins with water in the presence of an acidic catalyst and a water-soluble polyether solvent at an elevated temperature in the range of from 100° to 250° C.

CROSS-REFERENCE TO RELATED APPLICATIONS

This application is a continuation-in-part of our copending application Ser. No. 883,322, filed Dec. 8, 1969 now abandoned.

BACKGROUND OF THE INVENTION

The prior art has shown the hydration of mono-olefins such as ethylene to form alcohols, said reaction being effected in the presence of solvents such as alcohols, acids, ketones, etc. or monoethers. A criterion for the solvent which has been used in this prior art process is that the solvent material is readily miscible with the reactants thereby maintaining the olefin and water in a single liquid phase. Other prior art references have also disclosed the hydration of conjugated diolefins in the presence of acid-acting catalysts but without the use of the solvent of this invention. As will be hereinafter shown in greater detail, we have now unexpectedly discovered that by effecting the hydration of conjugated diolefinic compounds in the presence of an acidic catalyst and a water-soluble polyether solvent which comprises dialkyl ethers of alkylene glycols, it is possible to obtain improved yields of aldehydes and ketones over those yields which are obtained when effecting the reaction in the absence of these solvents.

SPECIFICATION

This invention relates to a process for preparing oxygen-containing compounds, and particularly to a process for converting diolefinic compounds into ketones and aldehydes, said process being effected in the presence of an acidic catalyst and a water-soluble polyether solvent.

Oxygen-containing compounds and particularly aldehydes and ketones are important chemicals for use as intermediates in the preparation of many industrially useful compounds. For example, isovaleraldehyde which is also known as methylbutyraldehyde naturally occurs in orange, lemon, peppermint and other oils. It is therefore an important component of flavoring compounds which possess the aforementioned flavors. In recent years fragrance and aroma chemicals are increasingly being made up of synthetically prepared compounds rather than the corresponding naturally occurring compounds. This is due to the fact that the aroma chemical manufacturers need not depend upon the whims and vagaries of nature in obtaining the necessary compounds which are blended as components in the final article of manufacture. Therefore, by utilizing synthetically prepared compounds which possess desirable odor characteristics, it is possible to be assured of a steady supply of the necessary ingredients which make up the final blend. As hereinbefore set forth, isovaleraldhyde is one of these compounds, the aldehyde being useful as a component which is present in flavoring compounds, perfumes, talcum powders, bath powders, colognes, after-shave lotions or other toiletry formulations, etc. In addition, isovaleraldehyde may also be useful in the preparation of pharmaceuticals, synthetic resins, rubber accelerators, etc. Other aldehyde compounds which are also useful include methylcapraldehyde and methylcaprylaldehyde which are useful as intermediates or components of various flavoring compounds in perfumery, etc. In addition, other oxygen-containing compounds such as ketones are also useful chemical compounds. For example, methyl isopropyl ketone and methyl butyl ketone (propyl acetone) are useful as solvents, methyl hexyl ketone is used in perfumes or as a high-boiling solvent, especially for epoxy resin coatings, as a major constituent in leather finishes, as an odorant or as an anti-blushing agent for nitrocellulose lacquers; methyl isoamyl ketone may be used as a solvent for nitrocellulose, cellulose acetate butyrate, acrylics and vinyl copolymers; methyl nonyl ketone may be used in perfumery while ethyl butyl ketone is used in solvent mixtures for air-dried and baked finishes as well as for polyvinyl and nitrocellulose resins.

It is therefore an object of this invention to provide a novel process for obtaining improved yields of the desired oxygen-containing compounds.

Another object of this invention is to convert dienic compounds, and particularly dienic hydrocarbons, to industrially important oxygen-containing compounds by treating said dienic compounds with water in the presence of certain catalytic compositions of matter and certain solvents.

In one aspect an embodiment of this invention resides in a process for the preparation of an oxygen-containing compound which comprises reacting a conjugated diolefinic hydrocarbon with water in the presence of a strong acid catalyst and a water-soluble dialkyl ether of an alkylene glycol as a solvent therefor at a temperature in the range of from about 100° to about 250° C. and a pressure in the range of from about atmospheric to about 100 atmospheres, and recovering the resultant oxygen-containing compound.

A specific embodiment of this invention is found in a process for the preparation of an oxygen-containing compound which comprises reacting 2-methyl-1,3-butadiene with water in the presence of a resin-sulfonic acid and the dimethyl ether of triethylene glycol at a temperature in the range of from about 100° to about 250° C. and a pressure in the range of from about atmospheric to about 100 atmospheres, and recovering the resultant methyl isopropyl ketone.

Other objects and embodiments will be found in the following further detailed description of the present invention.

As hereinbefore set forth the present invention is concerned with a process for converting diolefinic compounds to desirable oxygen-containing compounds by treating the aforesaid dienes with water in the presence of a strong acidic catalyst and also in the presence of a water-soluble polyether solvent of the type hereinafter set forth in greater detail. As will be shown in the following examples, it has now been unexpectedly found that by utilizing a water-soluble polyether solvent comprising, in the preferred embodiment of the invention, a dialkyl ether of an alkylene glycol, it is possible to obtain improved yields of the desired oxygen-containing compounds which, in the instant case, comprise aldehydes and ketones. In the preferred embodiment of the present application the diolefinic compounds comprise conjugated dienic hydrocarbons which contain a tertiary carbon atom. Some specific examples of these compounds will include 2-methyl-1,3-butadiene (isoprene), 2,3 - dimethyl - 1,3 - butadiene, 2 - methyl-1,3-pentadiene, 2,4-dimethyl - 1,3 - pentadiene, 2,3-dimethyl-1,3-pentadiene, 2-methyl - 2,4 - pentadiene, 2-methyl-1,3-hexadiene, 2,5 - dimethyl - 1,3 - hexadiene, 2-methyl-2,4-hexadiene, 2,3 - dimethyl - 2,4 - hexadiene, 2-methyl-1,3-heptadiene, 2,3 - dimethyl - 1,3 - heptadiene, 2,5-dimethyl-1,3-heptadiene, 2 - methyl - 2,4 - heptadiene, 2,3-dimethyl-2,4-heptadiene, 2-methyl - 1,3 - octadiene, 2,3-dimethyl-1,3-octadiene, 2-methyl - 2,4 - octadiene, 2,3-dimethyl-2,4-octadiene, 2 - methyl - 3,5 - octadiene, 4,5-dimethyl-3,5-octadiene, 2 - methyl - 1,3 - nonadiene, 2,3 - dimethyl-1,3-nonadiene, 2 - methyl - 2,4 - nonadiene, 3 - methyl-3,5-nonadiene, 2,3-dimethyl - 3,5 - nonadiene, 2-methyl-1,3-decandiene, 2,3 - dimethyl - 1,3 - decadiene, 2,5-dimethyl-1,3-decadiene, 2-methyl - 2,4 - decadiene, 2-methyl-3,5-decadiene, 4 - methyl - 4,6 - decadiene, 4,5-dimethyl-4,6-decadiene, the corresponding methyl-substituted undecadienes, tetradecadienes, dodecadienes, tridecadienes, pentadecadienes, hexadecadienes, heptadecadienes, octaecadienes, nonadecadienes, etc., other alkyl-substituted alkadienes, 1 - methyl - 1,3 - cyclopentadiene, 2-methyl-1,3-cyclopentadiene, 1-methyl - 1,3 - cyclohexadiene, 2-methyl-1,3 - cyclohexadiene, etc. While the aforementioned conjugated dienic compounds all contain a tertiary carbon atom, it is also contemplated within the scope of this invention that the dienic hydrocarbon may be straight chained in nature such as 1,3-butadiene, 1,3-pentadiene, 1,3-hexadiene, 2,4-hexadiene, 1,3-heptadiene, 2,4-heptadiene, 1,3-octadiene, 2,4-octadiene, etc. or it may also contain an aryl substituent such as 2-phenyl - 1,3 - butadiene, 2-phenyl - 1,3 - pentadiene, 2-phenyl - 1,3 - hexadiene, etc., although the conversion of these compounds may not necessarily be effected, or they may not behave, in the same manner as the dienic hydrocarbons which contain a tertiary carbon atom. It is to be understood that the aforementioned dienic hydrocarbons are only representative of the class of compounds which may be converted to aldehydes and ketones and that the present invention is not necessarily limited thereto.

As is hereinbefore set forth, the process of the present invention is effected in the presence of an acidic catalyst, suitable acidic catalysts which may be used including mineral acids such as sulfuric acid, phosphoric acid, etc.; the organic derivatives of sulfuric acid including alkanesulfonic acids such as methanesulfonic acid, ethanesulfonic acid, propanesulfonic acid, etc.; arenesulfonic acids such as benzenesulfonic acid, toluenesulfonic acid, etc.; and various resin-sulfonic acids, which are preferably sulfonated aromatic polymers or condensation products, such as polystyrenes, polystyrene-divinylbenzene copolymers or phenolformaldehyde resins, or polysulfonated aliphatic resins such as polyethylene, polypropylene and the like.

By utilizing a water-soluble solvent of the type hereinafter set forth in greater detail, it is possible to obtain greater yields of the desired oxygen-containing compound that can be obtained when effecting the reaction in the absence of such a solvent. The water-soluble solvents which are utilized in the process of the present invention comprise polyethers, and preferably dialkyl ethers of alkylene glycols, which are present in a range of from about 10% to about 400% by weight of the water which is present in the reaction zone, and preferably in a range of from about 25% to about 100% of the water. Suitable water-soluble polyether solvents which may be used are exemplified by the dimethyl ether of ethylene glycol, the diethyl ether of ethylene glycol, the dipropyl ether of ethylene glycol, the dimethyl ether of diethylene glycol, the diethyl ether of diethylene glycol, the dipropyl ether of diethylene glycol, the dimethyl ether of triethylene glycol, the diethyl ether of triethylene glycol, the dipropyl ether of triethylene glycol, the dimethyl ether of tetraethylene glycol, the diethyl ether of tetraethylene glycol, the dipropyl ether of tetraethylene glycol, the dimethyl ether of dipropylene glycol, the diethyl ether of dipropylene glycol, the dipropyl ether of dipropylene glycol, the dimethyl ether of tripropylene glycol, the diethyl ether of tripropylene glycol, the dipropyl ether of tripropylene glycol, the dimethyl ether of tetrapropylene glycol, the diethyl ether of tetrapropylene glycol, the dipropyl ether of tetrapropylene glycol, etc. In addition, it is also contemplated that the polyalkyl ethers of glycerol, diglycerol, pentaerythritol are also suitable and that the aforementioned water-soluble polyethers are only representative of the class of compounds which may be used and that the present invention is not necessarily limited thereto.

The diolefinic hydrocarbon of the type hereinbefore set forth in greater detail is reacted with water which is generally present in an amount in the range of from about 1:1 to about 15:1 moles of water per mole of dienic hydrocarbon, and preferably is present in a range of from about 5:1 to about 10:1 moles of water per mole of dienic hydrocarbon. The reaction is effected at elevated temperatures, the particular reaction temperature which is to be employed being dependent on and varying with the dienic hydrocarbon and the particular acidic catalyst which are used in the reaction. Generally, temperatures at which hydration of the dienic hydrocarbon will proceed at a faster rate than does the polymerization of the dienic hydrocarbon are preferred and will usually lie in a range of from about 100° to about 250° C. or more. The reaction may be effected at atmospheric pressure, although in the preferred embodiment of this invention superatmospheric pressures ranging from 2 to about 100 atmospheres or more may be employed, the superatmospheric pressure being that of the reactants or being provided for by the introduction of a substantially inert gas such as nitrogen into the reaction zone. The amount of pressure which is employed will be that which is sufficient to maintain a major portion of the reactants in the liquid phase.

The process of this invention may be effected in any suitable manner and may comprise either a batch or continuous type operation. For example, when a batch type operation is employed, a quantity of the starting materials comprising the diolefinic hydrocarbon and water, said reactants being present in a mole ratio within the range hereinbefore set forth, is placed in an appropriate apparatus which contains the acidic catalyst and the water-soluble polyether solvent, said solvent also being present in an amount according to the weight of water employed. The apparatus may comprise a reaction flask provided with heating, stirring and reflux means or may preferably comprise an autoclave of the rotating or mixing type. The reaction vessel is then heated to the predetermined operating temperature and, if so desired, operating pressure and maintained at these operating conditions for a predetermined residence time which may range from about 0.5 up to about 10 hours or more in duration. At the end of this time, heating is discontinued, the reaction vessel is allowed to return to room temperature and the reaction mixture is recovered. The mixture is separated from the catalyst by filtration if the catalyst is in solid state, one example of such a catalyst being a resin-sulfonic acid, and thereafter treated in a conventional manner such as extraction, washing, drying, distillation, etc., whereby the desired oxygen-containing compound such as an aldehyde or ketone is recovered.

It is also contemplated within the scope of this invention that the process whereby conjugated diolefinic hydrocarbons are converted to oxygen-containing compounds by reaction with water may be effected in a continuous manner of operation. For example, the reactants comprising the aforesaid conjugated diolefinic hydrocarbon and water are continuously charged to a reaction vessel which is maintained at the proper operating conditions of temperature and pressure. In addition, the catalyst and the water-soluble polyether solvent are also continuously charged to the reaction zone through separate lines or, if so desired, the aforesaid solvent may be admixed with the water prior to entry into said reactor and the mixture charged thereto in a single stream. As another alternative, the acidic catalyst, if in liquid form, may be admixed with one or both of the reactants and the resulting mixture continuously charged to the reactor in a single stream. After a predetermined residence time in the reactor has been completed, the reactor effluent is continuously discharged and the effluent subjected to separation means such as fractional distillation whereby the desired oxygen-containing compound such as an aldehyde is separated from the unreacted starting materials, catalyst, solvent and/or unwanted side products which may have been formed during the reaction. The desired oxygen-containing compound is recovered while the unreacted starting materials, catalyst and solvent may be recycled to the reaction zone.

In the event that a solid acidic catalyst such as a resin-sulfonic acid is employed, the continuous manner of operation may be effected in various types of reaction. One such type of operation is the fixed bed type of operation in which the solid catalyst is disposed as a fixed bed in the reactor and the reactants and solvent pass through said reactor in either an upward or downward flow. Another type of continuous operation which may be employed constitutes the moving bed type of operation in which the catalyst, the reactants and the solvent pass either concurrently or countercurrently to each other through the reaction zone. A third type of operation which may be used comprises a slurry operation in which the catalyst, in solid form, is carried into the reaction zone as a slurry in one or both of the reactants or solvent. When utilizing these various types of continuous operation which employ a solid catalyst, the reactor effluent which is continuously withdrawn from the reaction zone is subjected to a treatment similar in nature to that which has been hereinbefore discussed whereby the desired product comprising an oxygen-containing compound is recovered after separation from the various other components of the effluent and removed to storage.

The following examples are given to illustrate the process of the present invention which, however, are not intended to limit the generally broad scope of the present invention in strict accordance therewith.

Example I

In this example a mixture comprising 51 grams of 2-methyl-1,3-butadiene (isoprene), 100 grams of water, 100 grams of the dimethyl ether of triethylene glycol and 10 grams of a catalyst comprising a resinsulfonic acid (a sulfonated styrene-divinylbenzene copolymer) was placed in the glass liner of a rotating autoclave. The autoclave was sealed and nitrogen pressed in until an initial pressure of 30 atmospheres was reached. Thereafter the autoclave was heated to a temperature of 150° C. and maintained thereat for a period of 4 hours, the maximum pressure at this temperature being 60 atmospheres. At the end of this time, heating was discontinued and the autoclave allowed to return to room temperature. The excess pressure was discharged, the autoclave was opened and the reaction product was recovered. After separation from the catalyst by filtration, the product comprised a two-phase system. The lower phase was water-white in appearance and consisted of water, the dimethyl ether of triethylene glycol and some methyl isopropyl ketone. The upper layer was an amber liquid which comprised a portion of the dimethyl ether of triethylene glycol in which was dissolved unreacted isoprene plus an additional amount of methyl isopropyl ketone. Quantitative analysis of the layers by infra-red analysis showed that the methyl isopropyl ketone was produced in 40% yield based on the isoprene charged, the reaction being

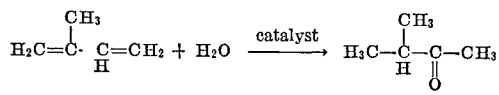

Example II

Another experiment was performed in which a mixture of 50 grams of 2-methyl-1,3-butadiene (isoprene) along with 100 grams of water and 10 grams of the same resin-sulfonic acid used in Example I was treated in a manner similar to that hereinbefore set forth in Example I, the only difference being that the water-soluble polyether solvent was omitted. The mixture was placed in the glass liner of a rotating autoclave which was sealed and pressured with nitrogen until an initial pressure of 30 atmospheres was reached. The autoclave was heated to a temperature of 150° C. and maintained thereat for a period of 4 hours. At the end of this time, heating was discontinued, the autoclave was allowed to return to room temperature and the excess pressure was discharged. The product was recovered from the autoclave and treated in a manner similar to that set forth in Example I. In this instance the desired product comprising methyl isopropyl ketone was recovered in only 18% yield based on the isoprene charged.

Example III

The beneficial effect of the polyether was again shown in this example. A mixture consisting of 52 grams of isoprene and only 52 grams of water, but 112 grams of the dimethyl ether of triethylene glycol along with a catalyst consisting of 10 grams of the resin-sulfonic acid was placed in the glass liner of a rotating autoclave which was thereafter sealed. Nitrogen was then pressed in until an initial pressure of 30 atmospheres was reached, and the autoclave was heated to a temperature of 150° C. After maintaining the autoclave at this temperature for a period of 4 hours, heating was discontinued and after a return to room temperature, the excess pressure was discharged. The reaction product was recovered, the two layers were separated and subjected to quantitative analyses. The desired product comprising methyl isopropyl ketone was present in a 45% yield based on the isoprene charged, again demonstrating the advantage of polyether inclusion.

Example IV

A mixture consisting of 52 grams of 2-methyl-1,3-pentadiene, 100 grams of water and 125 grams of the diethyl ether of diethylene glycol along with a catalyst consisting of 10 grams of methanesulfonic acid is placed in the glass liner of a rotating autoclave which is thereafter sealed. Nitrogen is then pressed in until an initial pressure of 30 atmospheres is reached, and the autoclave is heated to a temperature of 150° C. After maintaining the autoclave at this temperature for a period of 4 hours, heating is discontinued and after a return to room temperature, the excess pressure is discharged. The reaction product is recovered, the two layers are separated and subject to fractional distillation under reduced pressure. The desired product comprising ethyl isopropyl ketone is separated by this distillation and recovered.

Example V

In this experiment 45 grams of 2-methyl-1,3-hexadiene, 150 grams of water and 125 grams of the dimethyl ether of triethylene glycol along with 10 grams of concentrated sulfuric acid are placed in the glass liner of a rotating autoclave which is thereafter sealed. After pressuring in nitrogen until an intial pressure of 30 atmospheres is reached, the autoclave is heated to a temperature of 135° C. and maintained thereat for a period of 3 hours. Upon completion of the desired residence time, heating is discontinued, the autoclave is allowed to return to room temperature and the excess pressure is discharged. Upon opening the autoclave the reaction product consisting of a lower aqueous layer and an upper organic layer is separated, neutralized by the addition of an alkali and subjected to fractional distillation under reduced pressure. The desired product comprising chiefly propyl isopropyl ketone is recovered by this distillation from both layers, combined and placed in storage.

Example VI

A mixture of 50 grams of 2,3-dimethyl-1,3-butadiene, 100 grams of water, 100 grams of the dimethyl ether of triethylene glycol and 10 grams of a phosphoric acid on kieselguhr catalyst are placed in the glass liner of a rotating autoclave and treated in a manner similar to that set forth in the above examples. Upon completion of the desired residence time, during which the reaction is effected at elevated temperature and pressure of 150° C. and 30 atmospheres of nitrogen, the autoclave is cooled, the excess pressure is discharged and the reaction product is recovered. After treatment of this product in a manner similar to that hereinbefore set forth, the desired product comprising 2,3-dimethylbutyraldehyde is recovered.

Example VII

A mixture of 40 grams of 2-methyl-1,3-octadiene, 150 grams of water, 150 grams of the dimethyl ether of triethylene glycol and 10 grams of methanesulfonic acid is placed in the glass liner of a rotating autoclave. After sealing the liner into the autoclave and pressing in nitrogen until an initial pressure of 30 atmospheres is reached, the autoclave is heated to a temperature of 175° C. and maintained thereat for a period of 6 hours. Upon completion of the 6-hour period, heating is discontinued and the autoclave allowed to return to room temperature. After cooling has been accomplished, the excess pressure which remains is discharged, the autoclave is opened and the reaction product is recovered. The organic layer and the aqueous layer are separated and subjected to fractional distillation under reduced pressure whereby the desired product comprising pentyl isopropyl ketone and isomers is separated out and recovered.

We claim as our invention:

1. A process for the preparation of an oxygen-containing compound which comprises reacting a conjugated diolefinic hydrocarbon with water in the presence of a strong acid catalyst and a water-soluble dialkyl ether of an alkylene glycol as a solvent therefor which is present in the range of from about 10% to about 400% by weight of the water present at a temperature in the range of from about 100° to about 250° C. and a pressure in the range from about atmospheric to about 100 atmospheres, and recovering the resultant oxygen-containing compound.

2. The process as set forth in Claim 1 in which said strong acid catalyst is sulfuric acid.

3. The process as set forth in Claim 1 in which said strong acid catalyst is methanesulfonic acid.

4. The process as set forth in Claim 1 in which said strong acid catalyst is phosphoric acid.

5. The process as set forth in Claim 1 in which said strong acid catalyst is a resin-sulfonic acid.

6. The process as set forth in Claim 1 in which said dialkyl ether of an alkylene glycol is the dimethyl ether of triethylene glycol.

7. The process as set forth in Claim 1 in which said dialkyl ether of an alkylene glycol is the diethyl ether of diethylene glycol.

8. The process as set forth in Claim 1 in which said conjugated diolefinic hydrocarbon is 2-methyl-1,3-butadiene and said oxygen-containing compound is methyl isopropyl ketone.

9. The process as set forth in Claim 1 in which said conjugated diolefinic hydrocarbon is 2-methyl-1,3-pentadiene and said oxygen-containing compound is ethyl isopropyl ketone.

10. The process as set forth in Claim 1 in which said conjugated diolefinic hydrocarbon is 2-methyl-1,3-hexadiene and said oxygen-containing compound is propyl isopropyl ketone.

11. The process as set forth in Claim 1 in which said conjugated diolefinic hydrocarbon is 2,3 - dimethyl-1,3-butadiene and said oxygen-containing compound is 2,3-dimethylbutyraldehyde.

12. The process as set forth in Claim 1 in which said conjugated diolefinic hydrocarbon is 2-methyl-1,3-octadiene and said oxygen-containing compound is pentyl isopropyl ketone.

References Cited

FOREIGN PATENTS

| | | | |
|---|---|---|---|
| 990,434 | 4/1965 | Great Britain | 260—597 R |
| 1,015,929 | 1/1966 | Great Britain | 260—597 R |

LEON ZITVER, Primary Examiner

J. H. REAMER, Assistant Examiner

U.S. Cl. X.R.

260—604 R, 586 B, 590